United States Patent [19]

Moshofsky et al.

[11] 4,340,143

[45] Jul. 20, 1982

[54] HYDRAULIC BEAN CLEANING PROCESS AND APPARATUS

[75] Inventors: Jerome F. Moshofsky, Portland; Jerry Trout, Bridal Veil, both of Oreg.

[73] Assignee: Russell E. Waddle, Portland, Oreg.

[21] Appl. No.: 109,176

[22] Filed: Jan. 2, 1980

[51] Int. Cl.³ .............................................. B03B 5/62
[52] U.S. Cl. ................................... 209/158; 209/173; 209/500; 209/460
[58] Field of Search ............... 209/645, 158, 159, 162, 209/163, 172, 172.5, 173, 458, 459, 460, 461, 500, 501, 18, 160

[56] References Cited

U.S. PATENT DOCUMENTS

| | | | |
|---|---|---|---|
| 1,151,722 | 8/1915 | Schiechel | 209/500 X |
| 1,249,635 | 12/1917 | Keller | 209/158 |
| 1,895,504 | 1/1933 | Wrench | 209/172.5 |
| 2,982,410 | 5/1961 | Barr | 209/243 X |
| 3,452,862 | 7/1969 | Amadon | 209/173 X |

FOREIGN PATENT DOCUMENTS

| | | | |
|---|---|---|---|
| 250350 | 2/1911 | Fed. Rep. of Germany | 209/173 |
| 1053431 | 3/1959 | Fed. Rep. of Germany | 209/162 |
| 151334 | 9/1882 | France | 209/158 |
| 669210 | 8/1929 | France | 209/158 |
| 923888 | 2/1947 | France | 209/158 |
| 509291 | 12/1972 | U.S.S.R. | 209/172.5 |

*Primary Examiner*—Robert Halper
*Attorney, Agent, or Firm*—Klarquist, Sparkman, Campbell, Leigh, Whinston & Dellett

[57] ABSTRACT

A hydraulic bean cleaner for removing rocks from beans has a hopper for gravity-feeding uncleaned beans down an inner cylindrical tube into a cylindrical separator tank. The inner tube has a bean discharge opening centered just above the bottom of the tank. An outer cylindrical tube concentrically surrounds the inner tube, providing an annular passageway therebetween and a water discharge opening surrounding the bean discharge opening. A first vibrator vibrates the tubes as a unit to help feed the beans down the inner tube. A second vibrator vibrates the hopper independently of the tubes to aid in feeding the beans to the inner tube. The beans drop into the bottom of the tank and water is expelled downwardly into the tank around them. The water entrains and fluidizes the beans, carrying them laterally away from the bean discharge opening and buoying them upwardly. The turbulent flow of water agitates the beans. Agitation of the fluidized beans creates spaces between the beans through which rocks can sift downward to the bottom of the tank against the upward flow of the water. Near the top of the tank the beans and water overflow across a spillway into a colander. The colander strains the water into a sump. A pump recirculates the water in the sump back to the outer tube.

12 Claims, 6 Drawing Figures

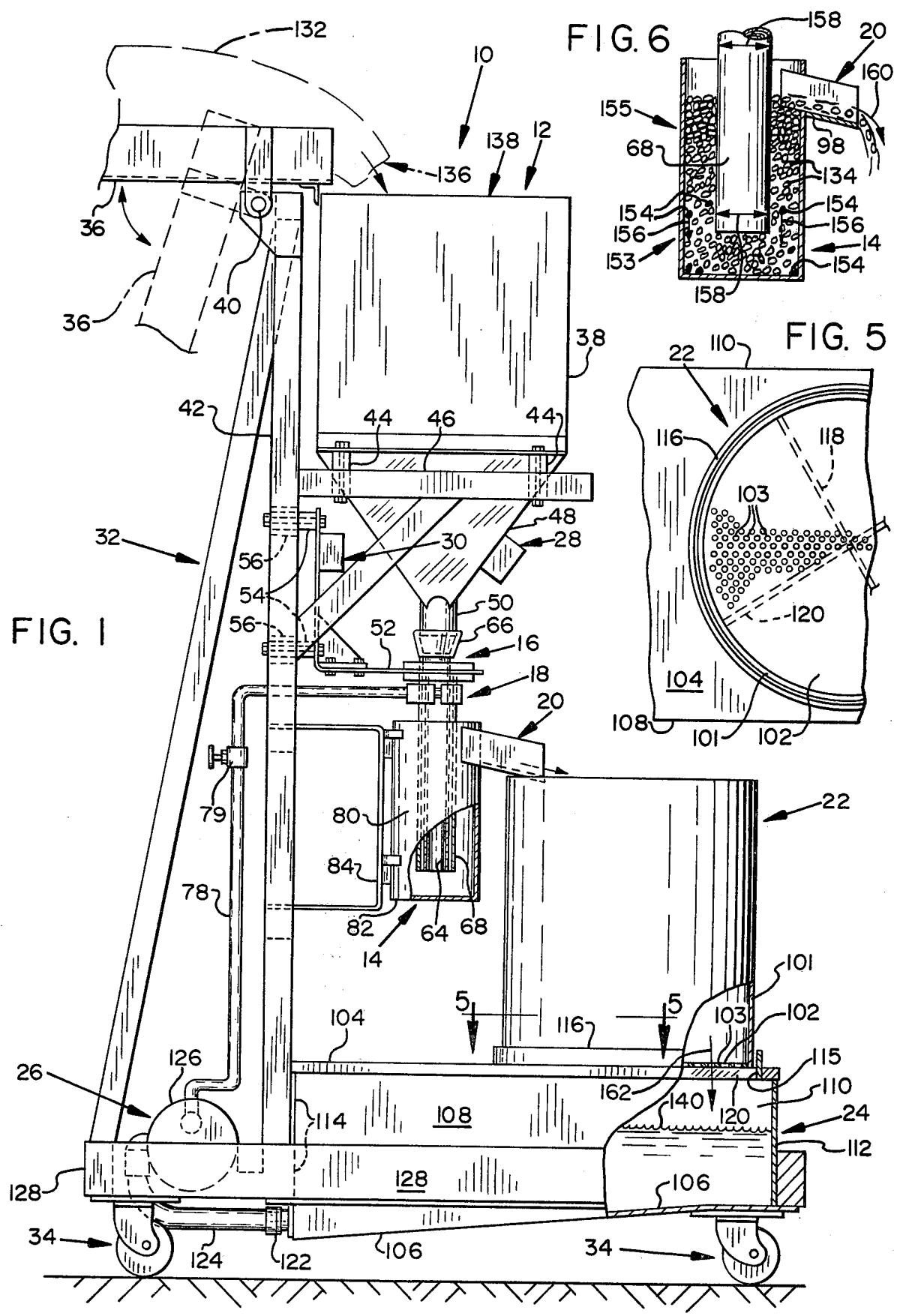

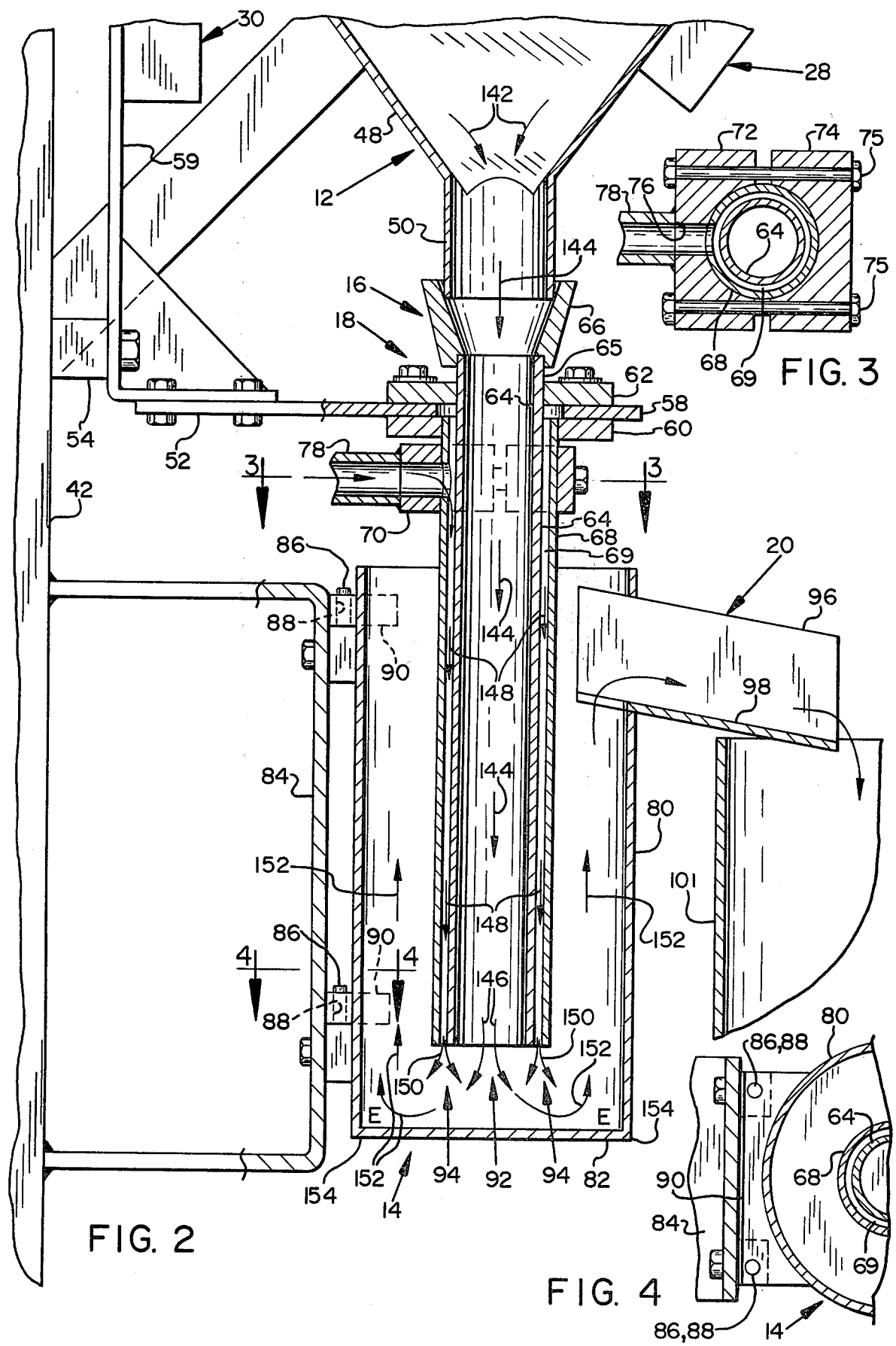

HYDRAULIC BEAN CLEANING PROCESS AND APPARATUS

BACKGROUND OF THE INVENTION

The invention relates generally to a process and apparatus for hydraulically separating objects of differing specific gravities, and more particularly to hydraulic removal of stones from beans and other legumes.

In the preparation of dried beans for use in chili, tacos and other human foodstuffs, it is very important to remove all stones to avoid dental injuries. Stones commonly become mixed with beans during harvest. The beans are customarily "field-cleaned" after harvest using air separation and screening apparatus resembling that disclosed in U.S. Pat. No. 1,080,069 to Lyng. However, air cleaning only removes light materials and screening does not remove stones having sizes equal to or smaller than the size of the beans. On the average, a 100 pound sack of beans includes about 200 stones after screening. Consequently, further cleaning is required to remove the remaining stones before the beans can be prepared for consumption by humans.

It is known that vegetable matters and stones have differing specific gravities. Accordingly, apparatus for hydraulically separating or cleaning foodstuffs by specific gravity have been proposed in U.S. Pat. Nos. to Cleveland, 2,422,657; Olney, 2,945,589; Rakowsky, 2,879,889; Wallace, 3,792,772; and Peterson et al., 4,111,798. However, these devices do not reliably separate stones from beans. Both beans and stones have a specific gravity greater than water or brine, and the specific gravity of the stones is greater than, but often very close to that of beans. Existing hydraulic separation methods and apparatus are too innaccurate to separate objects of such close specific gravities with complete reliability.

Exposure to water during separation softens the dried beans, making it necessary to cook them promptly after separation. Consequently, separation must ordinarily be accomplished at the location where the beans are to be cooked. This presents no difficulty for large-scale commercial food processors, but effectively precludes small-scale users, such as restaurants, from using existing hydraulic separation devices. Existing devices generally tend to be rather complicated, bulky and expensive, rendering them unsuitable for small-scale users. Consequently, such users must either buy pre-cooked beans or separate stones from dried beans manually. However, the processed beans cost much more than dried beans and manually separating stones from beans is not only expensive because of the high labor cost involved, but also unreliable because the percentage of stones among the beans is small and the stones are easily overlooked.

Thus, restaurants and other small-scale users of dried beans and the like continue to need a compact, inexpensive and highly reliable means for removing stones on the premises immediately prior to preparing the beans for human consumption.

The concept of hydraulically separating objects of different specific gravities has also been applied more broadly, for example, in placer mining for gold. One example of such apparatus is disclosed in U.S. Pat. No. 1,151,722 to Schiechel. Schiechel teaches the use of an upward current of water to buoy lighter particles of sand upward to separate them from the heavier metallic particles, and pulsating the current to hydraulically agitate the particles to assist in their separation. However, this apparatus is more complicated than necessary, requiring pressurized sources of both water and air. In addition, feed stock is added at the top of the apparatus. This results in mixing of the feed stock into the upwardly flowing sand and water so that some of the heavier metallic particles are prevented from sinking, and, thus, are not reliably separated.

SUMMARY OF THE INVENTION

It is therefore a primary object of the invention to provide an improved, yet simplified, apparatus for separating stones from legumes, grains and other foods.

Another primary object is to simplify apparatus used for hydraulically separating objects of higher and lower specific gravities.

Yet another primary object is to hydraulically separate objects having specific gravities greater than that of the separating liquid but very close to one another.

A further object is to provide a better process for hydraulically separating solid objects of only slightly differing specific gravities, but having specific gravities somewhat greater than that of water.

Yet another object is to provide an apparatus for performing the foregoing process.

A specific object of the invention is to reliably remove stones from legumes to be used for human consumption.

Another specific object is to completely remove all of a small number of stones from a relatively large quantity of dried beans.

A further object is to provide a hydraulic bean separator as aforementioned, which is sufficiently compact, lightweight, and inexpensive to be used by small-scale users, such as restaurants.

Prior to making the present invention, we experimented with several separation techniques. One experiment employed a column of liquid three feet tall. Rocks dropped into the liquid simultaneously with beans of the same dimensions reached the bottom of the column about four to five inches ahead of the beans, temporarily separating the beans and stones.

However, temporary separation was not enough. It therefore became an object of the invention to effect permanent separation of the stones and beans.

It also became apparent that the static separation column was useful only for batch separation because later-added stones would catch up with the more slowly sinking beans before the beans could be removed from the column. Thus, another object of the invention was to devise a method and apparatus for effecting continuous separation of stones from beans in such a way that they are not re-mixed.

Finally, we determined that use of a column three feet tall, or taller would be impractical for many uses because of space limitations. So another object of the invention was to obtain effective separation of objects of very similar specific gravities with a short separation tube.

According to the invention, field-cleaned beans are gravity-fed from a hopper into a separator tank through a downwardly-extending feed stock or bean conduit. The feed stock conduit has a central discharge opening positioned for discharging the beans downwardly into a lower portion of the tank. A water conduit extends downwardly alongside the feed stock conduit and has a peripheral discharge opening surrounding the central discharge opening for expelling water downwardly into the bottom of the tank around the beans.

The downwardly expelled water entrains or fluidizes the beans and carries them away from the region beneath the feed stock conduit. The bottom and side walls of the tank deflect the water and entrained beans laterally and then upwardly causing an upward flow of water which counteracts the tendency of the beans to sink. The rate of upward flow is adjusted so that the beans are borne upwardly while the slightly heavier stones are allowed to sink.

The bottom and side walls can be configured to produce a roiling action or turbulence in the water as its downward flow is reversed. Such turbulence creates spaces between the beans through which any stones can sift downwardly toward the bottom of the tank. The upwardly-borne beans thus accumulate free of stones in an upper portion of the tank. There, the beans and water overflow a spillway into a colander which strains the water from the beans into a sump. A pump recirculates the water back to the second conduit means.

A first vibrator vibrates the conduits as a unit to aid in gravity-feeding the bean feedstock through the bean conduit and to further agitate the fluidized beans. A second vibrator vibrates the hopper independently of the conduits to help feed the beans from the hopper.

The separator tank and conduits are vertically elongated to insure that no stones overflow with the beans, but their vertical lengths can be shorter than the length of a gravity separation column. The tank can have vertical side walls and a flat horizontal bottom defining corners to create eddies in the flow of water for catching and holding stones. The tank and conduit means can be concentrically cylindrical so that separation occurs uniformly around the tank.

The foregoing and other objects, features and advantages of the invention will become more apparent from the following description of a preferred embodiment of the invention which proceeds with reference to the drawings.

BRIEF DESCRIPTION OF THE DRAWINGS

FIG. 1 is a side elevational view of a hydraulic bean cleaner according to the invention, portions being cut away to show details of interior construction.

FIG. 2 is an enlarged side elevational view of a portion of the apparatus of FIG. 1, substantial portions being shown in vertical cross-section.

FIG. 3 is a cross-sectional view taken along line 3—3 in FIG. 2.

FIG. 4 is a partial cross-sectional view taken along line 4—4 in FIG. 2.

FIG. 5 is a partial cross-sectional view taken along line 5—5 in FIG. 1.

FIG. 6 is a side elevational view of the separator tank and conduits of FIG. 1 while in use, the separator tank, but not the conduits, being shown in cross-section.

DETAILED DESCRIPTION OF A PREFERRED EMBODIMENT

Bean Cleaning Apparatus

Referring to FIG. 1 a bean cleaner 10 according to the present invention has a hopper means 12, a separator tank 14, a bean conduit 16 and a water conduit 18. The separator tank has a spillway 20 for overflowing water and beans into a colander 22 for straining the water, but not the beans, into a sump 24. Pump means 26 connects the sump to the water conduit 18 for recirculating the water. A vibrator 28 is connected to the hopper 12 and another vibrator 30 is connected to the bean and water conduits 16, 18. The foregoing elements are all assembled on a frame 32 supported on wheels or casters 34.

The hopper means 12 is positioned uppermost on the frame. Its principal elements are a folding hopper feed tray 36 and hopper 38. The feed tray is connected above the hopper by pivot 40 between two vertical frame members 42, only one of which appears in the drawings. The hopper is connected by four flexible mounts 44 between two parallel frame members 46 extending horizontally from frame members 42. The hopper has a square cross-section and its lower portion 48 defines an inverted pyramidal funnel. At the end of the funnel is a short cylindrical tube 50 defining a bottom opening of the hopper. Vibrator 28 is mounted on portion 48.

The water and bean conduits 16, 18 are mounted on the horizontal leg 58 (FIG. 2) of an L-shaped bracket 52 and extend downwardly into tank means 14. The bracket is connected by flexible mounts 54 to two horizontal cross frame members 56. Vibrator 30 is connected to the vertical leg 59 of bracket 52 for vibrating the bean and water conduits as a unit independently of the separator tank.

Referring to FIG. 2, the horizontal leg 58 of bracket 52 is flat and is sandwiched between flat mounting plates 60, 62. The bean conduit includes an inner cylindrical tube 64 extending vertically through bracket leg 58 and mounting plates 60, 62, and connected to upper plate 62. Tube 64 is aligned coaxially beneath tube 50 and has an upper extension 65 flexibly connected to the outlet of tube 50 by a flexible rubber or plastic funnel 66. The flexible funnel enables vibrator 28 to vibrate the hopper independently of the bean and water conduits.

The water conduit includes an outer cylindrical tube 68 concentrically surrounding tube 64 and spaced therefrom to define an annular passageway 69. The radial width of passageway 69 can vary depending on the water flow rate required, which in turn, depends on the dimensions of the separator tank, the specific gravities of the objects to be separated and the liquid separating medium. Typically, this radial width is between about $\frac{5}{8}''$ and $\frac{1}{4}''$. The outer tube is connected to lower plate 60. Plates 60, 62 form a water-tight fit about bracket leg 58.

A water connector 70 connects passageway 69 to a source of water. Referring to FIG. 3, connector 70 includes two collar portions 72, 74 clamped together just below plate 60 by bolts 75 for a water-tight fit around tube 68. A bore 76 extends horizontally through collar portion 72 and tube 68 to connect passageway 69 with the bore of a water pipe 78 connected to pump means 26. Pipe 78 includes a hand valve 79 for adjusting the rate of water flow into the separator tank 14.

The separator tank 14 has a cylindrical, vertical side wall 80 and a flat, horizontal bottom wall 82 defining a closed tank bottom. The tank is preferably made of transparent material such as clear plastic to enable viewing the separation process and to monitor the level of stones collected in the tank. The tank is connected to frame members 42 by a U-shaped bracket 84 and is positioned so that side wall 80 concentrically surrounds tubes 64, 68. The tank is removably mounted on bracket 84 by two pairs of vertical mounting pins 86 received in holes 88 in two mounting plates 90 connected, one spaced above the other, to side wall 80.

Tubes 64, 68 lead downwardly into the separator tank. Their lower ends are spaced above bottom wall 82 a distance which is less than the inside diameter of tube 64d but greater than the lengths of the beans to be cleaned. The lower ends of the tubes are cut off substantially square and are open to provide a central bean discharge opening 92 and an annular water discharge opening 94 surrounding opening 92. This configuration enables introducing the bean feed stock into the tank as close as possible to the tank bottom without the beans backing up and jamming the bean conduit.

Spillway 20 is positioned in a rectangular opening (not shown) through an upper portion of side wall 80. The spillway has vertical, parallel side walls 96 and flat bottom wall 98 extending at a downward incline from side wall 80 into colander 22.

Both the tank and tubes 64, 68 are vertically elongated and laterally proportioned to provide an annular vertical passageway between the outer tube 68 and tank side wall 80. The passageway is relatively narrow so as to constrict the water flow sufficiently to maintain enough upward velocity to buoy the beans upward. In one operable example, the vertical distance from bottom wall 82 to the bottom wall 98 of the spillway is about $1\frac{2}{3}$ times the inside diameter of the tank, such diameter being about $2\frac{1}{2}$ times the outside diameter of tube 68. Thus, the radial width of the annular passageway is approximately $\frac{1}{4}$ its vertical length.

Referring to FIG. 5, the colander 22 has a cylindrical vertical side wall 101 and a horizontal perforated bottom wall 102 for straining the water from the beans. The colander is removably mounted on sump 24 (FIG. 1) for collecting water strained through perforations 103 in the bottom wall of the colander.

The sump means has a top wall 104, a bottom wall 106, side wall 108, 110 and end walls 112, 114. The top wall includes a large circular opening 115 beneath the colander. Surrounding the opening is a rim 116 for centering the colander. Spanning the opening are two horizontal crossed members 118, 120 for supporting the colander. Bottom wall 106 is inclined downwardly in the direction of end wall 114. Wall 114 has an outlet 122 at its lower end.

Pipe 124 connects outlet 122 to pump means 26 for drawing water from the sump. The pump means includes an electric motor (not shown) drivingly connected to a water pump 126.

Both the pump means and the sump are supported at the bottom of frame 32 between four horizontal frame members 128 defining sides of a rectangle. Four wheels 34 are connected to the frame, one at each corner formed by the interconnections of frame members 128.

The bean cleaner can be of small size to enable easy storage and use in small areas, such as restaurant kitchens. In one example, the bean cleaning apparatus has an overall height of five feet and lateral dimensions of two feet by three and one-half feet. In such example, the separator tank has a diameter of 5" and the vertical distance along side wall 80 from bottom wall 82 to the bottom wall 98 of overflow means 20 is 8". The inner tube 64 has a diameter of $1\frac{1}{2}$" and outer tube 68 has a diameter of 2", passageway 69 having a radial width of about $\frac{1}{8}$". The lower ends of the tubes are spaced about $\frac{3}{4}$" above bottom wall 82. The tubes are preferably made of stainless steel, as is the colander, for processing of human foodstuffs.

The bean cleaner of the foregoing example was tested by manually removing "all" stones from 100 pounds of beans, "salting" the beans with eight stones, and cleaning the beans in the bean cleaner operated as described below. After cleaning such beans, 15 stones were recovered from the separator tank.

Operation of Apparatus

The bean cleaner is prepared for use by pivoting feed tray 36 to a horizontal position and placing a sack 132 of beans 134 (FIG. 6) thereon with its opening 136 positioned above the hopper's top opening 138. The sump 24 is filled with water 140 and the pump means 26 is turned on. The beans are then dumped into the hopper and vibrators 28 and 30 are turned on.

Vibrator 28 vibrates the hopper on its flexible mounts 44 so that the beans descend in a continuous flow through tube 50, as indicated in FIG. 2 by arrows 142. The beans flow downwardly in a continuous stream through flexible funnel 66 into tube 64 and descend to central opening 92, as indicated by arrows 144. The beans then drop from opening 96 toward the bottom of the separator tank, as indicated by arrows 146. Vibrator 30 shakes tubes 64, 68 to help maintain a continuous downflow of beans through tube 64.

Meanwhile, pump 126 (FIG. 1) pumps water from the sump through pipes 124 and 78 to connector 70. Such water enters the connector through bore 76 and is distributed within annular water passageway 69. The water descends, under pressure, through the passageway to annular opening 94, as indicated by arrows 148. The water is expelled downwardly from annular opening 94 toward the bottom of tank 24 at high velocity, as indicated by arrows 150, entraining the discharged beans in the resulting turbulent flow of water. The water and beans are deflected laterally, then upwardly, by tank bottom and side walls 80, 82, effecting a flow reversal.

The water thus fluidizes the beans as they enter the tank through opening 92, conveys them laterally away from opening 92 and buoys them upward, as indicated by arrows 152. The lateral, then upward, flow of the water produces eddies E in the corner 154 defined by sidewall 80 and bottom wall 82. The abrupt reversal of the water flow also roils the water-bean mixture considerably in the lower portion 153 of the separator tank and to a progressively decreasing extent proceeding toward upper portion 155 of the tank.

Referring to FIG. 6, this roiling action or turbulence jostles or vibrates the beans and, thus, tends to produce spaces between the beans 134 in lower tank portion 153. Stones 154, discharged into the tank with the beans, travel laterally with the flow of beans. Some of the stones are then initially conveyed upwardly by the beans and water, while others are caught in eddies E. The stones conveyed upwardly do not travel far before losing momentum, typically less than half the vertical distance to the spillway 20. They are slowed down by the influence of gravity and by collisions with the more densely packed beans in the upper region 155 of the tank and, thus, begin to sift downward through the spaces between the beans toward the bottom of the tank, as indicated by arrows 156. Eventually the stones settle along tank bottom wall 82.

The water flow rate is adjusted using valve 79 to assure that the stones are reliably separated from the beans. If the flow rate is too high, some stones may be borne upwardly with the beans to the spillway 20. If too low, both stones and beans will settle to the bottom of the tank without being separated. The correct flow rate is determined by visually observing the action of the beans and stones in the separator tank. The flow rate should be high enough that the aforementioned roiling action occurs in at least the lower quarter of the separator tank below the spillway. The flow rate should not be so high that the roiling action extends to the surface of the water and beans. It is preferable to have the roiling action encompass approximately the lower one-half to two-thirds of the tank, the flow rate being adjusted accordingly. Operated in this range, the bean cleaner reliably removes all stones from dried beans.

Vibration of conduits 16, 18 by vibrator 30, as indicated by arrows 158, appears to aid in separating the rocks from beans as well as shaking the beans down tube 30 by jostling the fluidized beans in the tank to help produce spaces between the beans.

The upwardly-borne beans accumulate rock-free in the upper portion 155 of the separator tank. Once the tank has filled to the level of the bottom wall 98 of the spillway 20, the beans and water welling upwardly from beneath cause the beans and water in upper portion 155 to overflow in a continuous stream into the colander 22. The beans are retained in the colander while the water passes through the perforations 103 and opening 115 into sump 24 to be recirculated.

The level of rocks in the tank is visually monitored through the transparent walls of the tank. When sufficient stones have accumulated to nearly cover the bottom of the tank, or when a sack of beans has been cleaned, the pump is turned off, the tank is lifted from pins 86 and the stones are removed. The tank is then re-mounted on the pins. Colander 22 is usually emptied of beans at the same time. Thereafter, the bean cleaner can resume operation.

When use of the bean cleaner is complete, it can be unplugged, and tray 36 pivoted to a down position. The apparatus can then be rolled on wheels 34 to a suitable storage location.

Bean Cleaning Method

Following is a description of the preferred method of separating beans according to the invention. The foregoing bean cleaning apparatus, operated as described above, performs the steps of this method. However, other apparatus may be used as well.

In the first step, beans are fed in a continuous column downwardly through conduit 64 and drop through bean discharge opening 92 onto the bottom wall of separator tank 14 (arrows 144, 146). The beans 134 are discharged near the bottom of the tank to avoid mixing them with previously cleaned beans above.

Second, a continuous flow of water is discharged downwardly under pressure in an annular pattern from water discharge opening 94 surrounding opening 92, as indicated by arrows 150. The beans are entrained in the water and, thus, become fluidized.

Next, the downward flow of water is reversed to create a lateral and then upward flow of water as indicated by arrows 152. Being entrained in the water, the beans are conveyed laterally away from bean discharge opening 92 and then born upwardly by the water.

Simultaneously with reversing the downflow of water, a roiling action or turbulence is imparted into the water flow in the lower portion 153 of the tank. This action includes inducing eddies E adjacent the bottom of the tank along side wall 80 for catching and holding relatively heavier objects such as stones 154. The turbulence jostles or agitates the beans as they flow upwardly, creating spaces between them for the stones to sift downwardly between the beans.

The rate of water flow into the tank is adjusted so that the beans, but not the stones, are both upwardly in the tank. This adjustment can be made by adjusting the velocity of the upward flow rate of water to a rate greater than the velocity at which beans sink in still water, giving the beans a net upward velocity. For a tank of a given cross-sectional area, the upward flow rate is controlled by adjusting valve 79.

The upward flow of beans is then slowed, but not entirely halted, by accumulating beans in an upper portion 155 comprising about one-third to one-half of the tank. Slowing the upward flow allows any stones 154 initially born upwardly by the water and beans to lose momentum and begin to sink. Such stones sift downwardly through the spaces between the agitated beans in the lower portion of the tank and eventually come to rest on the bottom of the tank.

Next, the beans and water accumulated in the upper portion of the tank overflow the tank in a continuous stream (arrow 160). Finally, the water is strained from the rock-free beans (arrow 162). The water is collected in sump 24 and recycled by pump 126 back to the water discharge opening 94.

Having illustrated and described a preferred embodiment of the invention, it should be apparent to those skilled in the art that the invention may be modified in arrangement and detail. We claim as our invention all such modifications as come within the scope of the following claims.

We claim:

1. Apparatus for hydraulically separating stones from beans and the like, comprising:
    a bean hopper having a bottom opening;
    a water-filled separator tank having a spillway at an upper position along a side wall of the tank;
    a bean conduit leading downwardly from said bottom opening into the tank and having a downwardly directed bean discharge opening near a bottom wall of the tank;
    a water conduit surrounding the bean conduit to define a water passageway therebetween having a downwardly-directed water discharge opening surrounding the bean discharge opening, and water inlet means in said water conduit for introducing water into said water passageway;
    the water discharge opening being sized and positioned near said bottom wall so as to discharge the water in a high velocity downflow against said bottom wall all around the bean discharge opening; whereby introducing water into said passageway and bean feed stock containing stones into said hopper effects simultaneous discharge of water and feed stock from said discharge openings downwardly into the water in a lower portion of the tank, the feed stock being entrained in the downward flow of water and the downward flow of water being reversed to produce an upward flow of water and beans to the spillway to overflow from the tank while stones fall under the influence of gravity against said upward flow to settle to the bottom of the tank.

2. Apparatus according to claim 1 in which the separator tank has a vertical side wall and the bottom wall is substantially normal to the direction of down flow of water from the water discharge opening.

3. Apparatus according to claim 1 in which the bean and water conduits above said openings are centered in the tank and the tank has a vertical side wall spaced laterally from an outer wall of said conduits a distance that is less than the lateral width of said conduits.

4. Apparatus according to claim 3 including means for controlling the rate at which water is introduced into the water passageway.

5. Apparatus for hydraulically separating stones for beans and the like, comprising:
- a bean hopper having a bottom opening;
- a water-filled separator tank having a spillway at an upper position along a side wall of the tank;
- a bean conduit leading downwardly from said bottom opening into the tank and having a downwardly directed bean discharge opening near a bottom wall of the tank;
- a water conduit surrounding the bean conduit to define a water passageway therebetween having a downwardly-directed water discharge opening surrounding the bean discharge opening,
- a first vibrator connected for vibrating the bean and water conduits as a unit independently of the separator tank, and
- water inlet means in said water conduit for introducing water into said water passageway;
- whereby introducing water into said passageway and bean feed stock containing stones into said hopper effects simultaneous discharge of water and feed stock from said discharge openings downwardly into the water in a lower portion of the tank, the feed stock being entrained in the downward flow of water and the downward flow of water being reversed to produce an upward flow of water and beans to the spillway to overflow from the tank while stones fall under the influence of gravity against said upward flow to settle to the bottom of the tank.

6. Apparatus according to claim 5 in which the bean conduit is movably connected to the hopper so that the bean conduit can be vibrated relative to the bottom opening of the hopper.

7. Apparatus for hydraulically separating stones from beans and the like, comprising:
- a bean hopper having a bottom opening;
- a water-filled separator tank having a spillway at an upper position along a side wall of the tank;
- a bean conduit leading downwardly from said bottom opening into the tank and having a downwardly directed bean discharge opening near a bottom wall of the tank;
- a water conduit surrounding the bean conduit to define a water passageway therebetween having a downwardly-directed water discharge opening surrounding the bean discharge opening, and
- water inlet means in said water conduit for introducing water into said water passageway;
- the bean discharge opening being spaced above the bottom wall a distance that is slightly greater than the lengths of the beans to be cleaned;
- whereby introducing water into said passageway and bean feed stock containing stones into said hopper effects simultaneous discharge of water and feed stock from said discharge openings downwardly into the water in a lower portion of the tank, the feed stock being entrained in the downward flow of water and the downward flow of water being reversed to produce an upward flow of water and beans to the spillway to overflow from the tank while stones fall under the influence of gravity against said upward flow to settle to the bottom of the tank.

8. Apparatus for hydraulically separating stones from beans and the like, comprising:
- a bean hopper having a bottom opening;
- a water-filled separator tank having a spillway at an upper position along a side wall of the tank;
- a bean conduit leading downwardly from said bottom opening into the tank and having a downwardly directed bean discharge opening near a bottom wall of the tank;
- a water conduit surrounding the bean conduit to define a water passageway therebetween having a downwardly-directed water discharge opening surrounding the bean discharge opening, and
- water inlet means in said water conduit for introducing water into said water passageway;
- the bean and water conduits being cylindrical tubes concentrically positioned in said tank;
- the tubes being spaced apart such that the water passageway has a radial width between about one-eighth and one-quarter inches;
- the side wall of the separator being cylindrically concentric with said tubes and spaced laterally from the outer tube a distance less than the outside diameter of said outer tube;
- the discharge openings being spaced above the bottom wall a distance that is less than the inside diameter of the inner tube but sufficient to allow the beans to pass laterally between the ends of the tubes and the bottom wall of the tank;
- whereby introducing water into said passageway and bean feed stock containing stones into said hopper effects simultaneous discharge of water and feed stock from said discharge openings downwardly into the water in a lower portion of the tank, the feed stock being entrained in the downward flow of water and the downward flow of water being reversed to produce an upward flow of water and beans to the spillway to overflow from the tank while stones fall under the influence of gravity against said upward flow to settle to the bottom of the tank.

9. Apparatus for hydraulically separating objects having slightly differing specific gravities greater than the specific gravity of a single liquid separating medium, the apparatus comprising:
- a separator tank having a closed bottom and a spillway at an upper position along a side wall of the tank;
- a feed stock conduit extending downwardly into the tank and having a downwardly directed feed stock discharge opening in a lower portion of the tank;
- a liquid conduit extending downwardly into the tank alongside the feed stock conduit and having a downwardly directed liquid discharge opening surrounding the feed stock discharge opening and positioned at the same level as the feed stock discharge opening;
- means for introducing a feed stock of said objects into the feed stock conduit;
- means for introducing said liquid separating medium into the liquid conduit; and
- means for controlling the rate at which said medium is introduced into the liquid conduit to produce a downflow of medium surrounding the feedstock and having a high velocity, so that the feed stock and liquid separating medium are simultaneously discharged downwardly from their respective openings into a lower portion of the tank to become mixed together and to establish an upward flow of said medium around the conduits which bears a lighter fraction of said feed stock toward said spillway to overflow from the tank while a heavier fraction of said feed stock sinks against said upward flow toward the bottom of the tank.

10. A method of separating objects having slightly differing specific gravities, comprising:

discharging a feed stock of said objects in a continuous column downwardly from a first outlet into a lower portion of a tank having a closed bottom and containing a single liquid separating medium having a specific gravity less than the specific gravity of said objects;

discharging additional said medium from a second outlet into said lower portion at the level of said first outlet in a continuous downward flow closely surrounding and parallel to said column of feed stock to entrain said objects in the downward flow of said medium;

reversing said downward flow to establish an upward flow of said medium around said column; and controlling the rate of discharge of said medium to produce a high velocity turbulent downflow such that said objects are agitated and drawn downwardly and laterally away from said first outlet and objects of a lesser specific gravity are borne upwardly by the medium while objects of greater specific gravity sink to the bottom against said upward flow.

11. A method according to claim 10 in which discharging said feed stock and said medium includes discharging the feed stock and medium downwardly against the bottom of the tank and closely thereto in a concentric pattern so as to establish symmetrically uniform radially outward and upward flows on opposite lateral sides of the column of feed stock.

12. A method according to claim 10 or 11 including:

agitating the objects entrained in said medium sufficiently to create gaps between the objects in a lower portion of the tank so that objects of greater specific gravity can sink under the influence of gravity against the upward flow of said medium through said gaps;

accumulating said entrained objects in an upper portion of the tank to slow the upward movement and dampen the agitation of said objects so that any objects of greater specific gravity borne upwardly by the medium lose their momentum and begin to sink; and continuously overflowing from said tank a portion of the medium and objects accumulated in the upper portion of the tank.

* * * * *

UNITED STATES PATENT AND TRADEMARK OFFICE
CERTIFICATE OF CORRECTION

PATENT NO. : 4,340,143
DATED : July 20, 1982
INVENTOR(S) : JEROME F. MOSHOFSKY and JERRY TROUT It is certified that error appears in the above-identified patent and that said Letters Patent are hereby corrected as shown below:

Column 4, line 44, "5/8"" should be--1/8"--;
Column 8, line 4, "both" should be-- born--;
Column 9, line 9, "stones for" should be--stones from--.

Signed and Sealed this

Sixteenth Day of November 1982

[SEAL]

Attest:

GERALD J. MOSSINGHOFF

Attesting Officer    Commissioner of Patents and Trademarks